United States Patent
Gamand et al.

(10) Patent No.: US 10,615,852 B2
(45) Date of Patent: Apr. 7, 2020

(54) MULTI BEAM FORMER

(71) Applicant: NXP B.V.

(72) Inventors: Patrice Gamand, Douvres la Delivrande (FR); Philippe Descamps, Caen (FR)

(73) Assignee: NXP B.V., Eindhoven (NL)

( * ) Notice: Subject to any disclaimer, the term of this patent is extended or adjusted under 35 U.S.C. 154(b) by 416 days.

(21) Appl. No.: 15/590,665

(22) Filed: May 9, 2017

(65) Prior Publication Data

US 2017/0331528 A1 Nov. 16, 2017

(30) Foreign Application Priority Data

May 13, 2016 (EP) .................................... 16290082

(51) Int. Cl.
| | |
|---|---|
| *H01Q 3/26* | (2006.01) |
| *H01Q 3/36* | (2006.01) |
| *H01Q 3/40* | (2006.01) |
| *H04B 7/0408* | (2017.01) |
| *H01Q 25/00* | (2006.01) |
| *H04B 1/44* | (2006.01) |

(52) U.S. Cl.
CPC ......... *H04B 7/0408* (2013.01); *H01Q 3/2694* (2013.01); *H01Q 3/36* (2013.01); *H01Q 3/40* (2013.01); *H01Q 25/00* (2013.01); *H04B 1/44* (2013.01)

(58) Field of Classification Search
CPC ..................................................... H04B 7/0408
USPC ........................................................ 342/372
See application file for complete search history.

(56) References Cited

U.S. PATENT DOCUMENTS

2014/0225776 A1\* 8/2014 Harel ...................... H01Q 3/00
342/373

FOREIGN PATENT DOCUMENTS

| WO | 2015/152782 A1 | 10/2015 | |
|---|---|---|---|
| WO | WO-2015152782 A1 \* | 10/2015 | ............... H01Q 3/40 |

OTHER PUBLICATIONS

Konstantinos A Gotsis et al.: "Improved Butler Matrix Configuration for Smart Beamforming Operations", Antennas and Propagation (EUCAP), 2010 Proceedings of the Fourth European Conference on, IEEE, Piscataway, NJ, USA, Apr. 12, 2010 (Apr. 12, 2010), pp. 1-4, XP031705212, ISBN: 978-1-4244-6431-9 (Year: 2010).\*

(Continued)

*Primary Examiner* — Vladimir Magloire
*Assistant Examiner* — Helena H Seraydaryan
(74) *Attorney, Agent, or Firm* — Rajeev Madnawat

(57) ABSTRACT

A multi-beam-former for an antenna array is described, the multi-beam former comprises N transceiver terminals for connecting a transmitter and/or receiver and N antenna terminals for connecting to a respective antenna and a plurality of couplers and matrix phase shifters arranged in an N×N Butler matrix configuration between the N transceiver terminals and the N antenna terminals. At least some of the matrix phase shifters include a switchable matrix phase shifter configured to switch between a respective first phase shift value and a respective second phase shift value; a plurality of bypassable phase shifters arranged between at least some of the couplers and the antenna terminals and configured to switch between a respective further phase shift value and a zero phase shift. The multi-beam former is operable to select one of M different beam angles for a signal, wherein M is greater than N.

14 Claims, 7 Drawing Sheets

(56) References Cited

OTHER PUBLICATIONS

Gotsis, K. A. "Improved Butler Matrix configuration for smart beamforming operations", Proceedings of the Fourth European Conference on Antennas and Propagation, Barcelona, Spain, pp. 1-4 (2010).
Pozar, David M. "Microwave Engineering, 4th Edition" In: "Microwave Engineering, 4th Edition", Wiley, Hoboken, NJ, XP055318628, ISBN: 978-1-118-29813-8 pp. 534-537 (Dec. 21, 2011).
Adamidis, G.A. "Design and Implementation of a 4×4 Butler-Matrix Switched-Beam Antenna Array at the Microwave Communications and Electromagnetic Applications Lab of the Technological Educational Institute of Crete", 6 pgs., Retrieved from the Internet at: http://www.wseas.us/e-library/conferences/2005athens/ee/papers/507-176.pdf.
Patterson, C. E. "A 60-GHz Active Receiving Switched-Beam Antenna Array With Integrated Butler Matrix and GaAs Amplifiers", IEEE Transactions on Microwave Theory and Techniques, vol. 60, No. 11, pp. 3599-3607 (Nov. 2012).

* cited by examiner

MULTI BEAM FORMER

CROSS-REFERENCE TO RELATED APPLICATIONS

This application claims the priority under 35 U.S.C. § 119 of European Patent application no. 16290082.3, filed on 13 May 2016, the contents of which are incorporated by reference herein.

FIELD

This disclosure relates to a multi-beam-former for an antenna array.

BACKGROUND

Beam forming or beam steering is typically used in radio frequency (RF) applications such as radar and wireless communications using phased array antenna systems. Beam steering is typically done using either continuous beam steering using phase shifters or switched beam steering and allows the energy of a transmitted signal to be focussed in a particular direction. Beam steering may allow power consumption to be reduced while maintaining a good RF communication link. Beam steering may also increase the potential transmission range of an RF communication link. When receiving an RF signal, the use of beam steering also allows improved selectivity of a received signal from a particular direction.

SUMMARY

Various aspects of the disclosure are defined in the accompanying claims. In a first aspect there is defined a multi-beam-former for an antenna array, the multi-beam former comprising N transceiver terminals for connecting a transmitter and/or receiver and N antenna terminals for connecting to a respective antenna; a plurality of couplers and matrix phase shifters arranged in a N×N Butler matrix configuration between the N transceiver terminals and the N antenna terminals, at least some of the matrix phase shifters comprising a switchable matrix phase shifter configured to switch between a respective first phase shift value and a respective second phase shift value; a plurality of bypassable phase shifters arranged between at least some of the couplers and the antenna terminals and configured to switch between a respective further phase shift value and a bypass; wherein the multi-beam former is operable to select one of M different beam angles for a signal wherein M is greater than N.

In one or more embodiments M may be less than or equal to 2N.

In one or more embodiments, for each of the switchable matrix phase shifters, the respective first phase shift value is half the respective second phase shift value.

In one or more embodiments, for each of the bypassable phase shifters, the respective further phase shift value is equal to a phase shift value of at least one of the matrix phase shifters.

In one or more embodiments, the switchable matrix phase shifter may comprise a first switchable delay path in parallel with a second switchable delay path and wherein the first switchable delay path is half the value of the second switchable delay path.

In one or more embodiments, the first and second switchable delay path may comprise a transmission line. The first switchable delay path may have a delay value within 5% of one of $\lambda/8$, $\lambda/16$, $3\lambda/16$ and the second switchable delay path may have a delay value within 5% of one of $\lambda/16$, $\lambda/32$ and $3\lambda/32$ wherein $\lambda$ is the wavelength of the signal through the at least one respective delay path.

In one or more embodiments, the switchable phase shifter may comprise a series arrangement of a switch and a delay element in parallel with a series arrangement of a delay element and a switch.

In one or more embodiments, the respective first phase shift value for each of the switchable matrix phase shifters is within 5% of one of 22.5 degrees, 45 degrees and 67.5 degrees and the respective second phase shift value is within 5% of one of 11.25 degrees, 22.5 degrees and 33.75 degrees.

In one or more embodiments, the respective further phase shift value for each of the bypassable phase shifters is within 5% of at least one of 11.25, 22.5, 33.75, 45 and 67.5 degrees.

In one or more embodiments, each bypassable phase shifter may comprise a switchable bypass path in parallel with at least one switchable delay path. The switchable bypass path and switchable delay path may comprise a transmission line. The switchable delay path may comprise a delay of within 5% of at least one of $\lambda/8$, $3\lambda/16$, $\lambda/16$, $\lambda/32$ and $3\lambda/32$ wherein $\lambda$ is the wavelength of the signal through the at least one respective delay path. The bypass path may correspond to a zero phase shift.

Embodiments of the multi-beam former may be included in a receiver system comprising a receiver coupled to each of the transceiver terminals, a plurality of antennas coupled to a respective one of the antenna terminals; and wherein the receiver comprises a controller coupled to each of the switchable matrix phase shifters and the bypassable phase shifters, wherein the controller is operable in a first mode to select a first set of phase shift values and in a second mode to select a second set of phase shift values, and the receiver system is operable in the first mode to selectively receive a signal at one of N different beam angles and in the second mode to selectively receive a signal at one of a further N different beam angles.

Embodiments of the multi-beam former may be included in a transmitter system which may further comprise a transmitter coupled to each of the transceiver terminals, a plurality of antennas coupled to a respective one of the antenna terminals; and wherein the transmitter comprises a controller coupled to each of the switchable matrix phase shifters and the bypassable phase shifters, wherein the controller is operable in a first mode to select a first set of phase shift values and in a second mode to select a second set of phase shift values, and the transmitter system is operable in the first mode to selectively transmit a signal at one of N different beam angles and in the second mode to selectively transmit a signal at one of a further N different beam angles.

Embodiments of the multi-beam former may be included in a transceiver system which may further comprise a transceiver coupled to each of the transceiver terminals, a plurality of antennas coupled to a respective one of the antenna terminals; and wherein the transceiver comprises a controller coupled to each of the switchable matrix phase shifters and the bypassable phase shifters, wherein the controller is operable in a first mode to select a first set of phase shift values and in a second mode to select a second set of phase shift values, and the transceiver system is operable in the first mode to transmit or receive a signal at one of N different beam angles and in the second mode to transmit or receive a signal at one of a further N different beam angles.

In the figures and description like reference numerals refer to like features Embodiments of the invention are now described in detail, by way of example only, illustrated by the accompanying drawings in which:

FIG. 4 (a) illustrates a beam former for generating 8 steerable beams according to an embodiment and FIG. 4(b) illustrates the operation of the beam former of FIG. 4a.

DESCRIPTION

Figure 1:
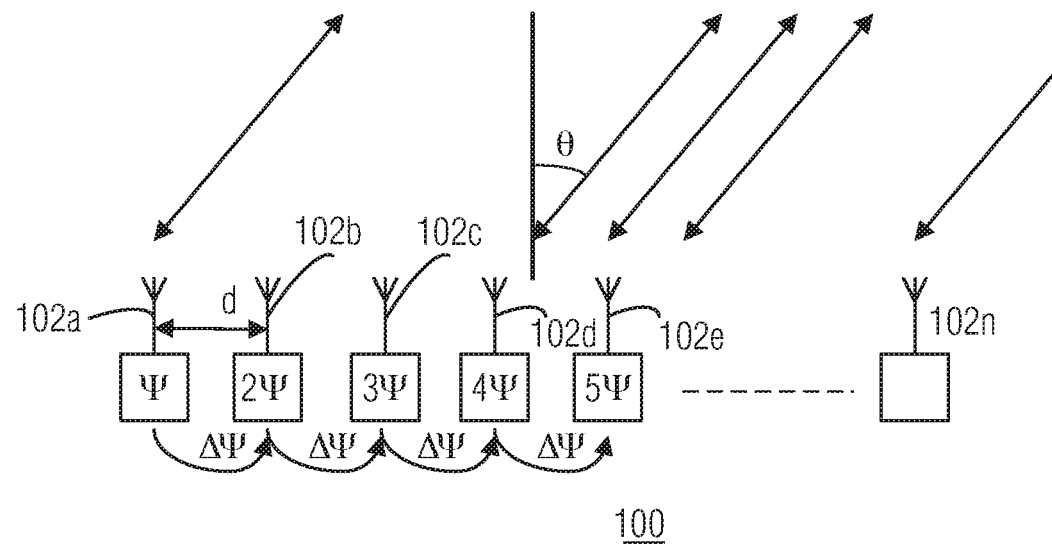
FIG. 1 shows the principle of beam steering of a phased antenna array.

FIG. 1 shows the principle of beam forming 100. The antennas 102a, 102b, 102c, 102, 102e to 102n of an n-antenna array may be supplied with a signal shifted by a constant angle $\Delta\Psi$ between each of the antennas and so may be referred to as a phased-array antenna. A transmitted beam is formed and is steered in a particular direction with an angle θ according to the following relationship:

$$\Delta\psi = 2\Pi\left(\frac{d}{\lambda}\right)\sin\theta \quad \text{Equation 1}$$

where d is the distance between antennas and the λ is the wavelength of the transmitted or received beam. If d=λ/2, i.e. half the wave length, then the steered angle is given by equation 2.

$$\theta = \arc\sin(\Delta\psi/\pi) \quad \text{Equation 2}$$

The phase shift required between each antenna may be implemented using a number of phase shift circuits. Alternatively a Butler matrix arrangement may be used. An N×N Butler matrix refers to a Butler matrix arrangement having N input/output ports, also referred to as transceiver terminals and a further N antenna ports or terminals.

Figure 2:
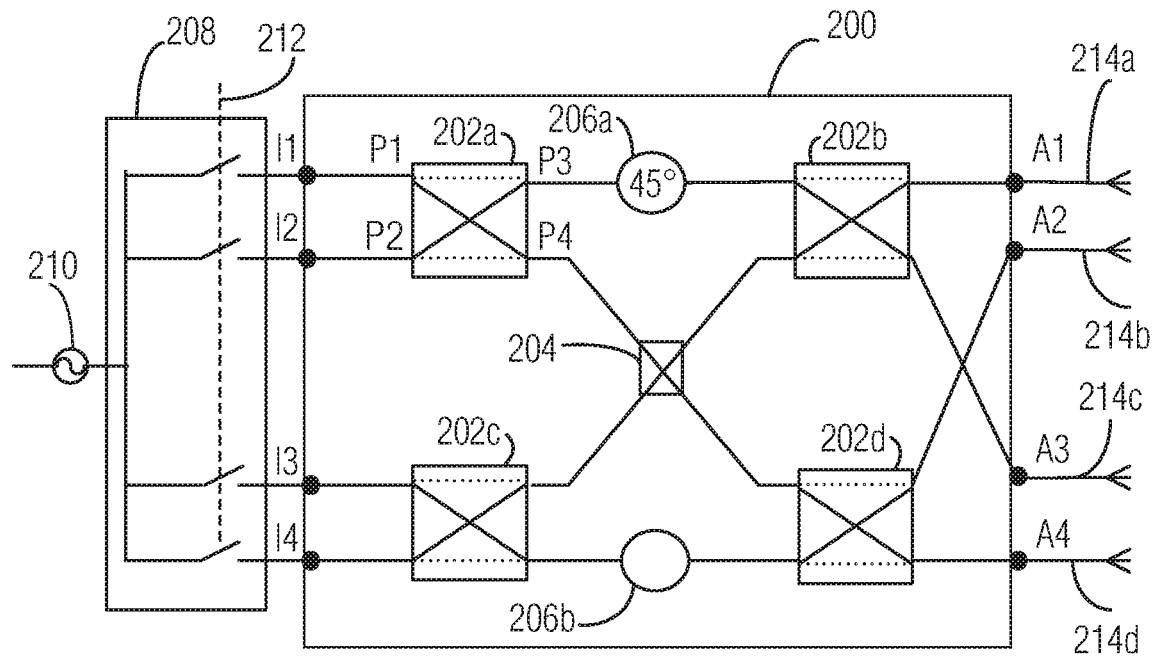
FIG. 2 illustrates a typical 4×4 Butler matrix beam former.
Figure 3:
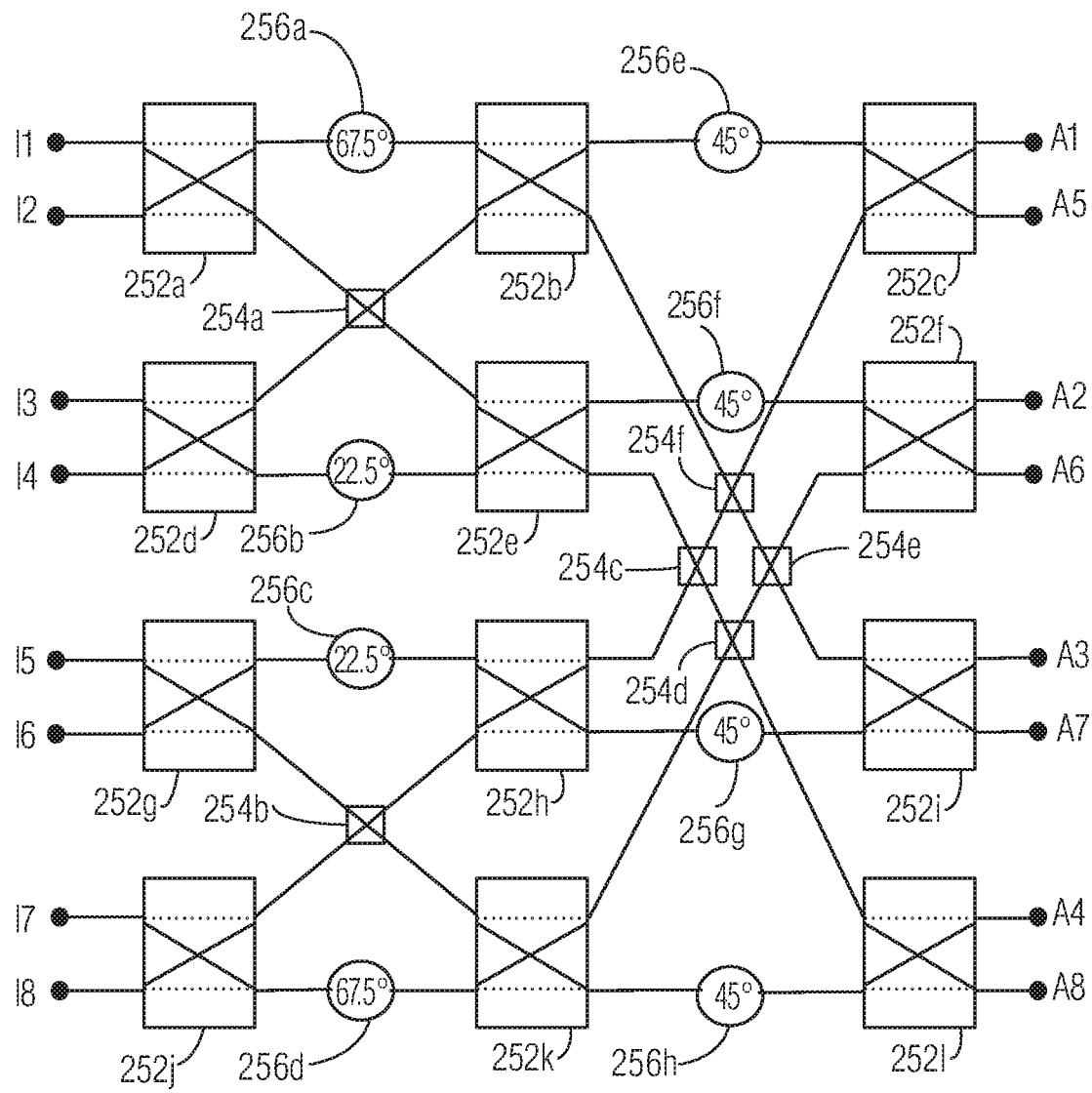
FIG. 3 shows a typical 8×8 Butler matrix beam former.

A typical example of a multi-beam former 200 using a 4×4 Butler matrix is shown in FIG. 2. The beam former 200 has four 4-port hybrid couplers 202a-d. Each of the hybrid couplers 202a-d can receive a signal on one of the ports and output a signal shifted by either 0 degrees or 90 degrees on two of the other ports. The 0 degree paths through each hybrid coupler 202a-d are indicated by the dashed line through each of the hybrid coupler 202a-d. The 90 degree shift paths are indicated by the solid lines through each of the hybrid couplers 202a-d. The port numbers for the hybrid couplers described will correspond to the first port p1, the second port p2, the third port p3 and the fourth port p4 as shown for hybrid coupler 202a. The 4×4 butler matrix also includes a cross-over 204 and 45 degree-phase shifters 206a, 206b, which may be referred to as matrix phase shifters.

The hybrid coupler 202a has first and second ports connected to first and second terminals i1, i2 which may be referred to as transceiver terminals. A third port of hybrid coupler 202a is connected to a first port of hybrid coupler 202b via the 45 degree phase shifter 206a. A fourth port of hybrid coupler 202a is connected to a first port of hybrid coupler 202d via a cross-over 204.

The hybrid coupler 202c has first and second ports coupled to third and fourth terminals i3, i4. A third port of hybrid coupler 202c is connected to a second port of hybrid coupler 202b via cross coupler 204. A fourth port of hybrid coupler 202a is connected to a second port of hybrid coupler 202d via a 45 degree phase shifter 206b.

The third and fourth ports of hybrid coupler 202b are connected to respective antenna terminals a1 and a3. The third and fourth ports of hybrid coupler 202d are connected to respective antenna terminals a2 and a4. Antenna terminals a1 to a4 are connected in operation to respective antennas 214a-d.

When used in a transmitter system, the multi-beam former 200 may be connected to a signal generator 210 which may generate a signal of a frequency greater than 300 MHz. The signal generator may be connected to the transceiver terminals i1 to i4 via a multiplexer 208 including a number of switches controlled via control line 212. The generated signal is connected to one of the four terminals i1 to i4 and depending on which input is used, the output beam will be steered or formed according to four different values of θ corresponding to four different values of $\Delta\Psi$ determined from equation 1. For antennas separated by a distance d=λ/2, these values of θ may be calculated from equation 2 and are given in Table 1 below together with the phase delay from the respective transceiver terminal i1 to 14 to the antenna terminal a1 to a4:

TABLE 1

| Transceiver port | θ (degrees) | $\Delta\Psi$ (degrees) | A1 phase delay | A2 phase delay | A3 phase delay | A4 phase delay |
| --- | --- | --- | --- | --- | --- | --- |
| I1 | +14 | −45 | 45 | 90 | 135 | 180 |
| I2 | −48 | +135 | 135 | 0 | 225 | 90 |
| I3 | +48 | −135 | 90 | 225 | 0 | 135 |
| I4 | −14 | +45 | 180 | 135 | 90 | 45 |

As the Butler matrix operates symmetrically it will be appreciated that if the antennas are used to receive a signal, the received signal strength on the respective ports i1 to i4 will be greatest at the respective value of the received beam angle θ.

In general for an N×N Butler matrix network consisting of N transceiver terminals, N antenna terminals, (N/2) log 2 (N) hybrid couplers and (N/2) (log 2 (N)−1) fixed phase shifters are required. An N×N Butler matrix may generate a beam with N different selectable beam angles. As the value of N increases the matrix complexity increases and also the insertion loss may increase. A Butler matrix is typically implemented as part of an antenna design using microstrip transmission lines laid out on a printed circuit board (PCB). The Butler matrix beam former arrangement may implement a beam former without the requirement of electronic phase shifters to determine the phases.

A further example of a beam former 250 using an 8×8 Butler matrix is shown in FIG. 2. The beam former 250 has 12 4-port hybrid couplers 252a-l. Each of the hybrid couplers 252a-l can receive a signal on one of the ports and output a signal shifted by either 0 degrees or 90 degrees on two of the other ports. The 0 degree paths through each hybrid coupler 252a-l are indicated by the dashed line through each of the hybrid coupler 242a-l. The 90 degree shift paths are indicated by the solid lines through each of the hybrid couplers 252a-l. The 8×8 butler matrix also includes cross-overs 254a-f and phase shifters 256a-h. Phase shifters 256a and 256d apply a fixed phase shift of 67.5 degrees. Phase shifters 256b and 256c apply a phase shift of 22.5 degrees. Phase shifters 256e-h apply a phase shift of 45 degrees.

First and second ports of hybrid coupler 252a are connected respectively to transceiver terminals I1 and I2. First and second ports of hybrid coupler 252d are connected respectively to transceiver terminals I3 and I4. First and second ports of hybrid coupler 252g are connected respectively to transceiver terminals I5 and I6. First and second ports of hybrid coupler 252j are connected respectively to transceiver terminals I7 and I8.

A third port of hybrid coupler 252a is connected via phase shifter 256a to a first port of hybrid coupler 252b. A fourth port of hybrid coupler 252a is connected to a first port of hybrid coupler 252e via a crossover 254a.

A third port of hybrid coupler 252d is connected to a second port of hybrid coupler 252b via the crossover 254a.

A fourth port of hybrid coupler 252a is connected via phase shifter 256b to a second port of hybrid coupler 252e.

A third port of hybrid coupler 252g is connected via phase shifter 256c to a first port of hybrid coupler 252h. A fourth port of hybrid coupler 252g is connected to a first port of hybrid coupler 252k via a crossover 254b.

A third port of hybrid coupler 252j is connected to a second port of hybrid coupler 252h via the crossover 254b. A fourth port of hybrid coupler 252j is connected via phase shifter 256d to a second port of hybrid coupler 252k.

A third port of hybrid coupler 252b is connected to a first port of hybrid coupler 252c via a phase shifter 256e. A fourth port of hybrid coupler 252b is connected to a first port of hybrid coupler 252i via crossovers 254e and 254f.

A third port of hybrid coupler 252e is connected to a first port of hybrid coupler 252f via a phase shifter 256f. A fourth port of hybrid coupler 252e is connected to a first port of hybrid coupler 252i via crossovers 254c and 254d.

A third port of hybrid coupler 252h is connected to a second port of hybrid coupler 252c via crossovers 254c and 254f. A fourth port of hybrid coupler 252h is connected to a second port of hybrid coupler 252i via a phase shifter 256g.

A third port of hybrid coupler 252k is connected to a second port of hybrid coupler 252f via crossovers 254d and 254e. A fourth port of hybrid coupler 252h is connected to a second port of hybrid coupler 252l via a phase shifter 256h.

A third port of hybrid coupler 252c is connected to first antenna terminal a1. A fourth port of hybrid coupler 252c is connected to fifth antenna terminal a5.

A third port of hybrid coupler 252f is connected to second antenna terminal a2. A fourth port of hybrid coupler 252f is connected to sixth antenna terminal a6.

A third port of hybrid coupler 252i is connected to third antenna terminal a3. A fourth port of hybrid coupler 252i is connected to seventh antenna terminal a7.

A third port of hybrid coupler 252l is connected to fourth antenna terminal a4. A fourth port of hybrid coupler 252l is connected to eighth antenna terminal a8.

When used in a transmitter system, the butler matrix 250 may be connected to a signal generator (not shown) which may generate a signal of a frequency greater than 300 MHz. The signal generator may be connected to the transceiver terminals i1 to i8 via a multiplexer (not shown). The generated signal is connected to one of the eight terminals i1 to i8 and depending on which input is used, the output beam will be steered or formed according to eight different values of θ corresponding to four different values of ΔΨ determined from equation 1. For antennas separated by a distance d=λ/2, the values of θ may be determined from equation 2 and are given in Table 2 below together with the phase delay or phase shift from the respective transceiver terminal i1 to I8 to the antenna terminal a1 to a8:

TABLE 2

| Transceiver port | θ (degrees) | ΔΨ (degrees) | A1 phase delay | A2 phase delay | A3 phase delay | A4 phase delay | A5 phase delay | A6 phase delay | A7 phase delay | A8 phase delay |
| --- | --- | --- | --- | --- | --- | --- | --- | --- | --- | --- |
| I1 | 7 | −22.5 | 112.5 | 135 | 157.5 | 180 | 202.5 | 225 | 247.5 | 270 |
| I2 | −61 | 157.5 | 202.5 | 45 | 247.5 | 90 | 292.5 | 135 | 337.5 | 180 |
| I3 | 39 | −112.5 | 135 | 247.5 | 0 | 112.5 | 225 | 337.5 | 90 | 202.5 |
| I4 | −22 | 67.5 | 225 | 157.5 | 90 | 22.5 | 315 | 247.5 | 180 | 112.5 |
| I5 | 22 | −67.5 | 112.5 | 247.5 | 225 | 22.5 | 90 | 157.5 | 225 | 0 |
| I6 | −39 | 112.5 | 202.5 | 90 | 337.5 | 225 | 112.5 | 0 | 247.5 | 135 |
| I7 | −7 | 22.5 | 270 | 247.5 | 225 | 202.5 | 180 | 157.5 | 135 | 112.5 |
| I8 | 61 | −157.5 | 180 | 337.5 | 135 | 292.5 | 90 | 247.5 | 45 | 202.5 |

Figure 4A:
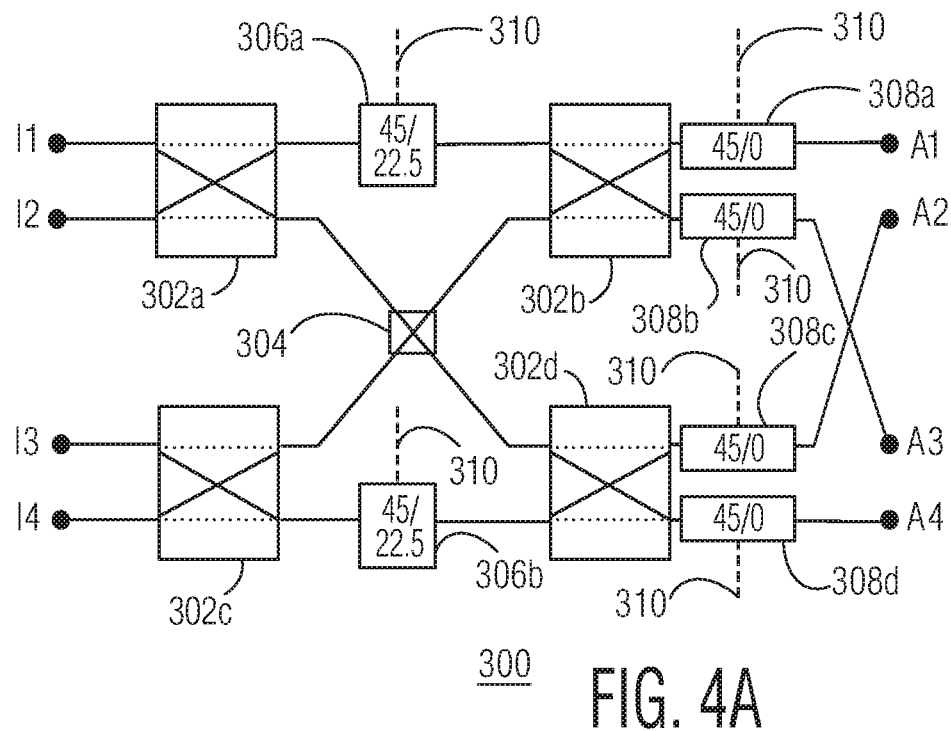

FIG. 4A shows a multi beam former 300 for generating 8 beam angles according to an embodiment.

The beam former 300 has four 4-port hybrid couplers 302a-d which can receive a signal on one of the ports and output a signal shifted by either 0 degrees or 90 degrees on two of the other ports of the respective hybrid coupler. The 0 degree paths through each hybrid coupler 302a-d are indicated by the dashed line through each of the hybrid coupler 302a-d. The 90 degree shift paths are indicated by the solid lines through each of the hybrid couplers 202a-d. The hybrid couplers are arranged in a 4×4 butler matrix arrangement also including a cross-over 204 and switchable matrix phase shifters 306a, 306b which can be switched between a phase shift of 45 degrees or 22.5 degrees. The beam former 300 also include bypassable phase shifters 308a-d which are switchable between a value of 45 degrees phase shift and 0 degrees phase shift. It will be appreciated in practice that a phase shift within 5% of these phase shift values may still give acceptable accuracy of beam forming or steering. The switchable phase shifters 306a, 306b and bypassable phase shifters 308a-d may be controlled via a control bus 310 indicated as a dashed line. The control of some of the phase shifters 306a, 306b and bypassable phase shifters 308a-d may be via a single control line or multiple control lines.

The hybrid coupler 302a has first and second ports coupled to first and second terminals i1, i2 which may be referred to as transceiver terminals. A third port of hybrid coupler 302a is connected to a first port of hybrid coupler 302b via the switchable phase shifter 306a. A fourth port of hybrid coupler 302a is connected to a first port of hybrid coupler 302d via a cross-over 304.

The hybrid coupler 302c has first and second ports coupled to third and fourth terminals i3, i4. A third port of hybrid coupler 302c is connected to a second port of hybrid coupler 302b via cross coupler 304. A fourth port of hybrid coupler 302a is connected to a second port of hybrid coupler 302d via a switchable matrix phase shifter 306b.

The third and fourth ports of hybrid coupler 302b are connected to respective antenna terminals a1 and a3 via bypassable phase shifters 308a and 308b. The third and fourth ports of hybrid coupler 302d are connected to respective antenna terminals a2 and a4 via bypassable phase shifter 308c and 308d. Antenna terminals a1 to a4 are connected in operation to respective antennas (not shown).

Figure 4B:
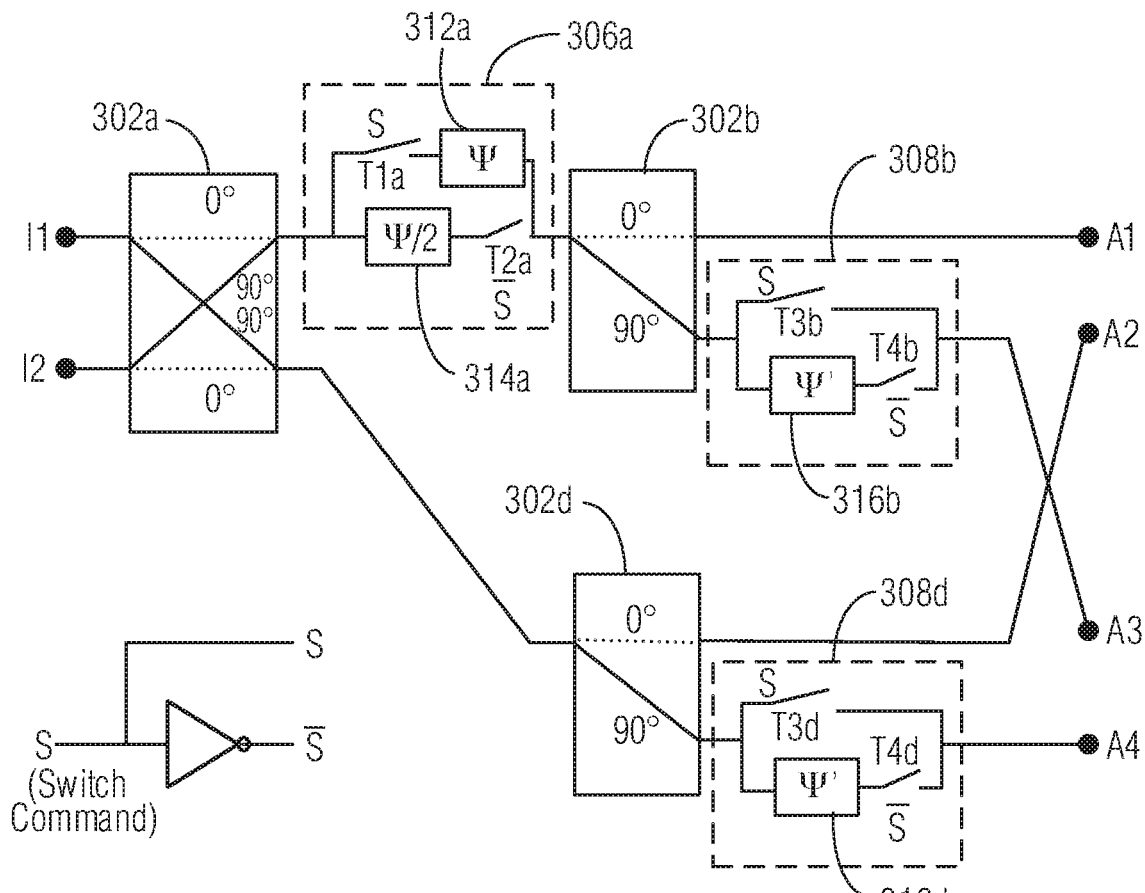

Referring now to FIG. 4B, the operation of the beam former 300 is illustrated for inputs i1 and i2. The elements required for operation using the i3 and i4 terminals have been omitted but as will be appreciated because of the symmetry of the beam former 300, the operation of the beam former 300 may be understood by considering the phase shifts when i1 and i2 are used. The bypassable phase shifters 308a and 308c are set to bypass corresponding to a zero phase shift when i1 and i2 are used and so have been omitted.

The switchable matrix phase shifter 306a may each include a series arrangement of a first switch T1a and a delay element or path 312a shown as having a delay $\Psi$ in parallel with a series arrangement of a second switch T2a and a second delay element or path 314a shown as having a delay $\Psi/2$. Switches T1a and T2a may for example by implemented using a MOS transistor, other transistor, or a PiN Diode The switchable matrix phase shifter 306b may have a similar structure. The value of $\Psi$ may be different or the same for each switchable matrix delay element 306a, 306b and may correspond to the phase delay value of a conventional N×N Butler matrix. In Beam-former 300 the value of $\Psi$ may be 45 degrees for each switchable matrix delay element 306a, 306b.

The bypassable shifters 308b, 308d may each include a first switch T3b, T3d in parallel with a series arrangement of a second switch T4b, T4d and a delay element or path 316b, 316d shown as having a delay $\Psi'$. Switches T3b, T3d may for example by implemented using a MOS transistor, or a PiN Diode. The bypassable shifters 308a and 308c may have a similar structure. The value of $\Psi'$ may be different or the same for each bypassable phase shifter 308a to 308d. The value of $\Psi'$ may correspond to a phase delay value of $\Psi/2$ or $\Psi$ of one of the switchable matrix phase shifters 306a, 306b.

In operation of the beam former 300, in a first mode of operation the switch command S may close switches T1a, T3b and T3d and so the complementary switch command $\bar{S}$ may open switches T2a, T4b and T4d. The phase delay values of the switchable matrix phase shifters 306a, 306b in this mode may correspond to that of the typical 4×4 Butler matrix 200. The bypassable phase shifters 308b, 308d may be set in bypass. In a second mode of operation, the switch command S may open switches T1a, T3b and T3d and so the complementary switch command $\bar{S}$ may close switches T2a, T4b and T4d. This allows two beam angles to be generated from each input i1 to i4 of the beam former 300.

The beam angles θ for the beam former 300 are shown in Table 3 for all for transceiver terminals i1 to i4. The values of i1(0), i2(0), i3(0), i4(0) correspond to the delays in the typical butler matrix. The values of i1(1), i2(1), i3(1), i4(1) correspond to the delays when the alternative phase delays are switched.

TABLE 3

| Transceiver port | θ (degrees) | ΔΨ (degrees) | A1 phase delay | A2 phase delay | A3 phase delay | A4 phase delay |
|---|---|---|---|---|---|---|
| I1(0) | 14 | −45 | 45 | 90 | 135 | 180 |
| I1(1) | 22 | −67.5 | 22.5 | 90 | 157.5 | 225 |
| I2(0) | −48 | 135 | 135 | 0 | 225 | 90 |
| I2(1) | −38 | 112.5 | 112.5 | 0 | 247.5 | 135 |
| I3(0) | 48 | −135 | 90 | 225 | 0 | 135 |
| I3(1) | 38 | −112.5 | 135 | 247.5 | 0 | 112.5 |
| I4(0) | −14 | 45 | 180 | 135 | 90 | 45 |
| I4(1) | −22 | 67.5 | 225 | 157.5 | 90 | 22.5 |

The beam former 300 can generate 8 beam angles from a 4×4 Butler matrix arrangement. This may allow a significant reduction in the area of the beam former 300 compared to a beam former using an 8×8 Butler matrix. For example, the footprint area of the 8×8 Butler matrix 250 may be determined by the 3 columns of hybrid couplers and 2 columns of phase shifters in the X-direction and the 4 rows of hybrid couplers in the Y direction. For the beam former 300 the footprint area may be determined by 2 columns of couplers, 1 column of switchable matrix phase shifters and 1 column of the bypassable phase shifters in the X-direction and the 2 rows of hybrid couplers in the Y-direction.

Typically the area required to implement the hybrid couplers is greater than the phase shifters, the switchable phase shifters and the bypassable phase shifters. Assuming that the hybrid coupler is implemented in a square footprint with side L, and also assuming that the longest dimension is in the X-direction of the phase shifters and is also equal to L, for the 8×8 Butler matrix 250 the footprint area may be 4L×5L=20L². Similarly for the beam former 300, the footprint area may be 2L×4L=8L², i.e. a factor of 2.5 times smaller.

Further, since there is one fewer layer of passive components in the path between the transceiver terminals and the antenna terminals in beam former 300 compared to 8×8 Butler matrix 250, the insertion loss may be reduced.

In other examples of the beam former 300 one of the switchable matrix elements 306a, 306d may be eliminated and replaced with a fixed 45 degree phase shift if fewer than 8 beam angles are required.

Figure 5A:
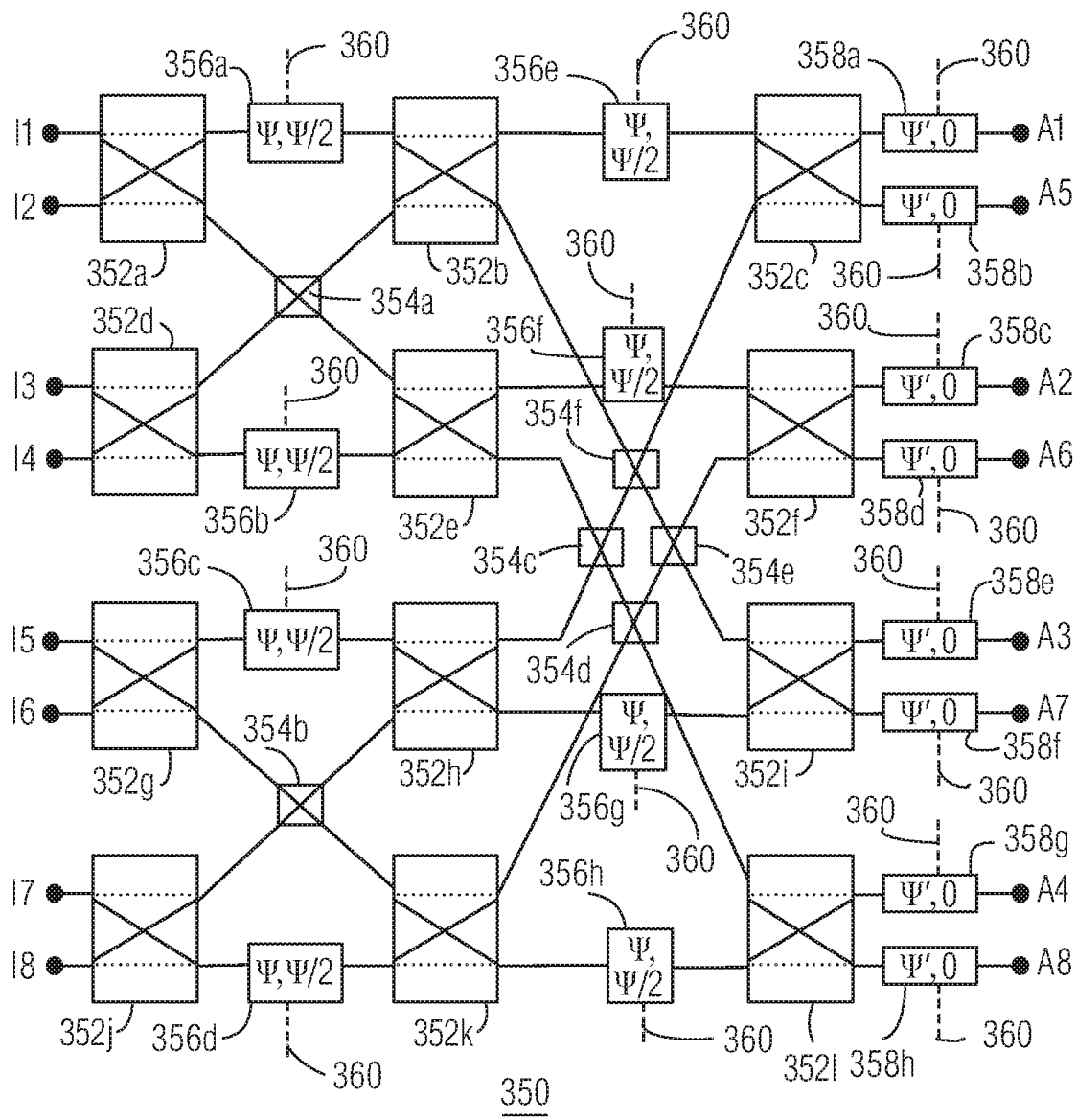
FIG. 5(a) shows a beam former for generating 16 steerable beams according to an embodiment and FIG. 5(b) shows an illustration of the operation of the beam former of FIG. 5a for one of the transceiver terminals

FIG. 5A shows a multi-beam former 350 for generating 16 beam angles. The beam former 300 has 12 4-port hybrid couplers 352a-l. Each hybrid coupler 352a-l can receive a signal on one of the ports and output a signal shifted by either 0 degrees or 90 degrees on two of the other ports. The 0 degree paths through each hybrid coupler 352a-l are indicated by the dashed line. The 90 degree shift paths are indicated by the solid lines through each of the hybrid couplers 352a-l. The beam former 350 includes cross-overs 354a-f and switchable matrix phase shifters 356a-h.

The hybrid couplers 352a-l, cross-overs 354a-f and switchable matrix phase shifters 356a-h are arranged as an 8×8 Butler matrix. The switchable matrix phase shifters 356a-h may be controllable to switch between a value $\Psi$ corresponding to a phase delay value in the 8×8 butler matrix in beam former 250 and a value of Ψ/2.

The beam former 300 also include bypassable phase shifters 308a-d which are switchable between two different values of Ψ' phase shift and 0 degrees phase shift. The value of Ψ' may correspond to one of the values of Ψ or Ψ/2 in the switchable matrix phase shifters 356a-h. The switchable matrix phase shifters 356a-h, and bypassable phase shifters 358a-h may be controlled via a control bus 360 indicated as a dashed line. The control of some of the switchable matrix phase shifters 356a-h, and bypassable phase shifters 358a-h may be via a single control line or multiple control lines.

First and second ports of hybrid coupler 352a are connected respectively to transceiver terminals I1 and I2. First and second ports of hybrid coupler 352d are connected respectively to transceiver terminals I3 and I4. First and second ports of hybrid coupler 352g are connected respectively to transceiver terminals I5 and I6. First and second ports of hybrid coupler 352j are connected respectively to transceiver terminals I7 and I8.

A third port of hybrid coupler 352a is connected via switchable matrix phase shifter 356a to a first port of hybrid coupler 352b. A fourth port of hybrid coupler 352a is connected to a first port of hybrid coupler 352e via a crossover 354a.

A third port of hybrid coupler 352d is connected to a second port of hybrid coupler 352b via the crossover 354a. A fourth port of hybrid coupler 352a is connected via switchable matrix phase shifter 356b to a second port of hybrid coupler 352e.

A third port of hybrid coupler 352g is connected via switchable matrix phase shifter 356c to a first port of hybrid coupler 352h. A fourth port of hybrid coupler 352g is connected to a first port of hybrid coupler 352k via a crossover 354b.

A third port of hybrid coupler 352j is connected to a second port of hybrid coupler 352h via the crossover 354b. A fourth port of hybrid coupler 352j is connected via switchable matrix phase shifter 356d to a second port of hybrid coupler 352k.

A third port of hybrid coupler 352b is connected to a first port of hybrid coupler 352c via a switchable matrix phase shifter 356e. A fourth port of hybrid coupler 352b is connected to a first port of hybrid coupler 352i via crossovers 354e and 354f.

A third port of hybrid coupler 352e is connected to a first port of hybrid coupler 352f via a switchable matrix phase shifter 356f. A fourth port of hybrid coupler 352e is connected to a first port of hybrid coupler 352i via crossovers 354c and 354d.

A third port of hybrid coupler 352h is connected to a second port of hybrid coupler 352c via crossovers 354c and 354f. A fourth port of hybrid coupler 352h is connected to a second port of hybrid coupler 352i via a switchable matrix phase shifter 356g.

A third port of hybrid coupler 352k is connected to a second port of hybrid coupler 352f via crossovers 354d and 354e. A fourth port of hybrid coupler 352h is connected to a second port of hybrid coupler 352l via a switchable matrix phase shifter 356h.

A third port of hybrid coupler 352c is connected to first antenna terminal a1 via a bypassable phase shifter 358a. A fourth port of hybrid coupler 352c is connected to fifth antenna terminal a5 via a bypassable phase shifter 358b.

A third port of hybrid coupler 352f is connected to second antenna terminal a2 via a bypassable phase shifter 358c. A fourth port of hybrid coupler 352f is connected to sixth antenna terminal a6 via a bypassable phase shifter 358d.

A third port of hybrid coupler 352i is connected to third antenna terminal a3 via a bypassable phase shifter 358e. A fourth port of hybrid coupler 352i is connected to seventh antenna terminal a7 via a bypassable phase shifter 358f.

A third port of hybrid coupler 352l is connected to fourth antenna terminal a4 via a bypassable phase shifter 358g. A fourth port of hybrid coupler 352l is connected to eighth antenna terminal a8 via a bypassable phase shifter 358h.

Figure 5B:
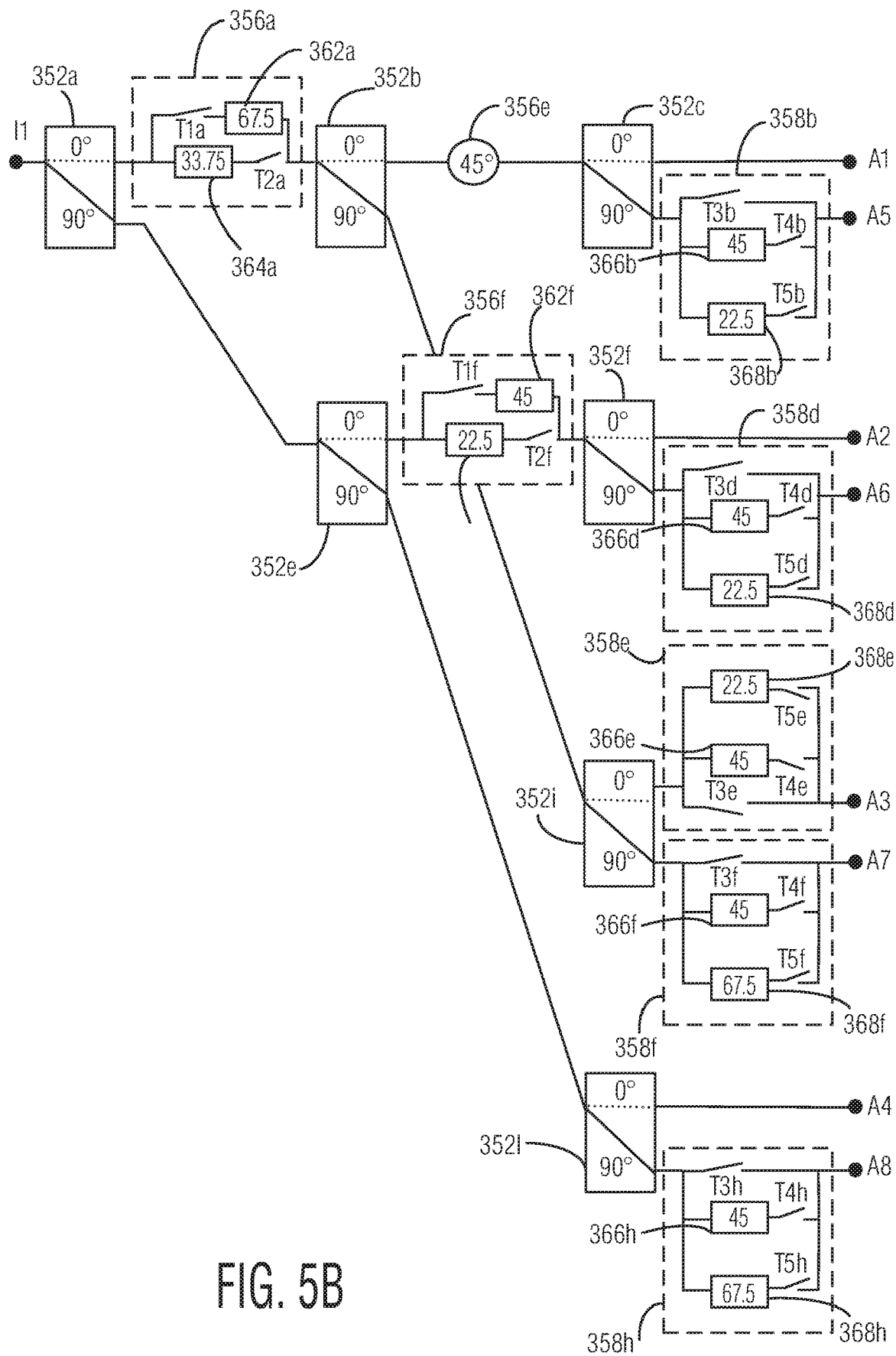

Referring now to FIG. 5B, the operation of the beam former 350 is illustrated for input i1. The elements required for operation using the remaining terminals have been omitted. The bypassable phase shifters 358a, 358c, 358g are set to bypass corresponding to a zero phase shift when i1 is used and so have been omitted. The switchable matrix phase shifter 356e is set to 45 degrees in both modes when i1 is used and is shown as a fixed value.

The switchable matrix phase shifters 356a, 356f may each include a respective first series arrangement of a first switch T1a, T1f, which may for example by implemented using a MOS transistor, or a PiN Diode and a delay element or path 362a, 362f. The first switch T1a, T1f and delay element or path 362a, 362f may be arranged in parallel with a respective series arrangement of a second switch T2a, T2f and a second delay element or path 364a, 364f. The switchable matrix phase shifters 356b-e and 356g-l may have a similar structure. The delay value of 362a may be 67.5 degrees, the delay value of second delay element 364a may be 33.75 degrees. The delay value of delay element 362f may be 45 degrees, the delay value of second delay element 365f may be 22.5 degrees.

The bypassable phase shifters 358b, 358d-f and 358h may each include a first switch T3b, T3d, T3e, T3f, T3h which may for example by implemented using a MOS transistor, or a PiN Diode in parallel with a first series arrangement of a second switch T4b, T4d, T4e, T4f, T4h and a delay element or path 366b, 366d, 366e, 366f, 366h. The first switch T3b, T3d, T3e, T3f, T3h may be in parallel with a second series arrangement of a third switch T5b, T5d, T5e, T5f, T5h and a delay element or path 368b, 368d, 368e, 368f, 368h The bypassable phase shifters 358a, 358c, 358g may have a similar structure. The value of each delay element or delay path may be different or the same for each bypassable phase shifter 358a to 358h. The value may correspond to a phase delay value of one of the switchable matrix phase shifters 356a-h. As shown, the delay value of delay 366b is 45 degrees, the delay value of delay 368b is 22.5 degrees, the delay value of delay 366d is 45 degrees, the delay value of delay 368d is 22.5 degrees, the delay value of delay 366e is 22.5 degrees, the delay value of delay 368e is 22.5 degrees, the delay value of delay 366f is 45 degrees, the delay value of delay 368f is 67.5 degrees, the delay value of delay 366h is 45 degrees, the delay value of delay 368h is 45 degrees. It will be appreciated in practice that the phase delays may be within 5% of these values.

In operation of the beam former 350, in a first mode of operation switches T1a, T1f, T3b, T3d, T3e, T3f, T3h may be closed with the remaining switches in the respective switchable matrix phase delays and bypassable phase delays open. The phase delay values in this mode correspond to that of the typical 8×8 Butler matrix 250. In a second mode of operation, switches T2a, T2f, T4b, T4d, T5e, T5f, and T3h may be closed. The remaining switches in the respective switchable matrix phase delays and bypassable phase delays are open. In this mode, the selected phase shift values result in a change of relative phase shift ΔΨ between the signal at the antenna terminals from −22.5 degrees or λ/16 to −33.75 degrees or 3λ/32, where λ is the wavelength of the signal propagating through the beam former 350.

This allows two beam angles to be generated from each transceiver terminal i1 to i8 of the beam former 350.

The beam angles for the beam former 350 are shown in Table 4 for all for transceiver terminals i1 to i8.

TABLE 4

| Transceiver port | θ (degrees) | ΔΨ (degrees) | A1 phase delay | A2 phase delay | A3 phase delay | A4 phase delay | A5 phase delay | A6 phase delay | A7 phase delay | A8 phase delay |
|---|---|---|---|---|---|---|---|---|---|---|
| I1(0) | 7 | −22.5 | 112.5 | 135 | 157.5 | 180 | 202.5 | 225 | 247.5 | 270 |
| I1(1) | 11 | −33.75 | 78.75 | 112.5 | 146.25 | 180 | 213.75 | 247.5 | 281.25 | 315 |
| I2(0) | −61 | 157.5 | 202.5 | 45 | 247.5 | 90 | 292.5 | 135 | 337.5 | 180 |
| I2(1) | −54 | 146.25 | 168.75 | 22.5 | 236.25 | 90 | 303.75 | 157.5 | 371.25 | 225 |
| I3(0) | 39 | −112.5 | 135 | 247.5 | 0 | 112.5 | 225 | 337.5 | 90 | 202.5 |
| I3(1) | 43 | −123.75 | 112.5 | 236.25 | 0 | 123.75 | 247.5 | 371.25 | 135 | 258.75 |
| I4(0) | −22 | 67.5 | 225 | 157.5 | 90 | 22.5 | 315 | 247.5 | 180 | 112.5 |
| I4(1) | −18 | 56.25 | 202.5 | 146.25 | 90 | 33.75 | 337.5 | 281.25 | 225 | 168.75 |
| I5(0) | 22 | −67.5 | 112.5 | 247.5 | 315 | 22.5 | 90 | 157.5 | 225 | 0 |
| I5(1) | 18 | −56.25 | 168.75 | 225 | 281.25 | 337.5 | 33.75 | 90 | 146.25 | 202.5 |
| I6(0) | −39 | 112.5 | 202.5 | 90 | 337.5 | 225 | 112.5 | 0 | 247.5 | 135 |
| I6(1) | −43 | 123.75 | 258.75 | 135 | 371.25 | 247.5 | 123.75 | 0 | 236.25 | 112.5 |
| I7(0) | −7 | 22.5 | 270 | 247.5 | 225 | 202.5 | 180 | 157.5 | 135 | 112.5 |
| I7(1) | −11 | 33.75 | 315 | 281.25 | 247.5 | 213.75 | 180 | 146.25 | 112.5 | 78.75 |
| I8(0) | 61 | −157.5 | 180 | 337.5 | 135 | 292.5 | 90 | 247.5 | 45 | 202.5 |
| I8(1) | 54 | −146.25 | 225 | 371.25 | 157.5 | 303.75 | 90 | 236.25 | 22.5 | 168.75 |

The beam former 350 can generate 16 beam angles from an 8×8 Butler matrix arrangement. The values of i1(0), i2(0), i3(0), i4(0), i5(0), i6(0), i7(0), i8(0) correspond to the delays in the typical 8×8 butler matrix. The values of i1(1), i2(1), i3(1), i4(1), i5(1), i6(1), i7(1), i8(1) correspond to the delays when alternative phase delay values are switched. Table 5 includes the alternative phase delay values selected in the switchable matrix phase delays 356a-h and the bypassable phase delays 358b-h for each of the transceiver terminals i1 to i8.

TABLE 5

| | i1(1) | i2(1) | i3(1) | i4(1) | i5(1) | i6(1) | i7(1) | i8(1) |
|---|---|---|---|---|---|---|---|---|
| Bypass Shift | | | | | | | | |
| a1 bypass (358a) | 0 | 0 | 0 | 0 | 67.5 | 67.5 | 45 | 45 |
| a5 bypass (358b) | 0 | 0 | 0 | 0 | 45 | 45 | 67.5 | 67.5 |
| a2 bypass (358c) | 22.5 | 22.5 | 0 | 0 | 45 | 45 | 45 | 45 |
| a6 bypass (358d) | 0 | 0 | 22.5 | 22.5 | 45 | 45 | 45 | 45 |
| a3 bypass (358e) | 45 | 45 | 45 | 45 | 22.5 | 22.5 | 0 | 0 |
| a7 bypass (358f) | 45 | 45 | 45 | 45 | 0 | 0 | 22.5 | 22.5 |
| a4 bypass (358g) | 67.5 | 67.5 | 45 | 45 | 0 | 0 | 0 | 0 |
| a8 bypass (358h) | 45 | 45 | 67.5 | 67.5 | 0 | 0 | 0 | 0 |
| Switchable Matrix Shift | | | | | | | | |
| 356a | 33.75 | 33.75 | — | — | — | — | — | — |
| 356b | — | — | 11.25 | 11.25 | — | — | — | — |
| 356c | — | — | — | — | 11.25 | 11.25 | — | — |
| 356d | — | — | — | — | — | — | 33.75 | 33.75 |
| 356e | 45 | 45 | 22.5 | 22.5 | — | — | — | — |
| 356f | 22.5 | 22.5 | 45 | 45 | — | — | — | — |
| 356g | — | — | — | — | 45 | 45 | 22.5 | 22.5 |
| 356h | — | — | — | — | 22.5 | 22.5 | 45 | 45 |

Multi-beam former 350 may generate 16 steerable beam angles with a reduced area compared to a 16×16 Butler matrix. In other example beam formers requiring fewer than 16 beam angles, some switchable matrix phase shifters 356a-h may be replaced by fixed value phase shifters.

Figure 6A:
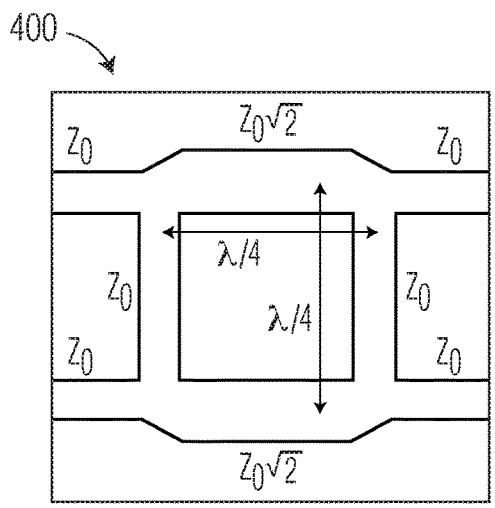
FIG. 6 illustrates a) typical implementation of a hybrid coupler used in beam formers and b) a cross section of a microstrip transmission line.

FIG. 6a shows a typical hybrid coupler 400 which may be implemented using microstrip transmission lines. The hybrid coupler may also be referred to as a branch line coupler. For Car 2× transceiver system operating at 5.8 GHz, the hybrid coupler 400 may use quarter wavelength λ/4 lines, where $$\lambda = \frac{c}{f * \sqrt{Er_{eff}}}$$

where c is the light velocity, $Er_{eff}$ is the effective relative permittivity which is approximately (Er+1)/2, where Er is the relative permittivity, and f is the signal operating frequency, 5.8 GHz in this example.

Figure 6B:
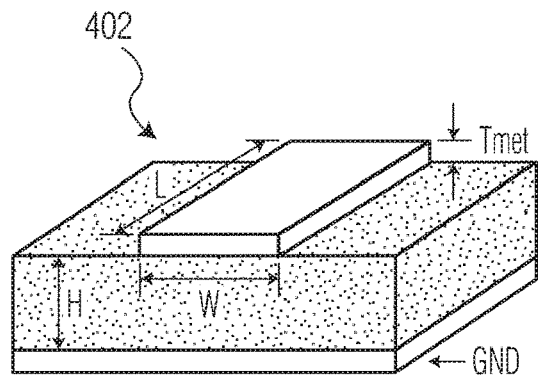

For example printed circuit board (PCB) characteristics using Rogers RO4000® laminates, relative permittivity Er=3.48, H=0.508 mm, and for copper metal tracks, at a 5.8 GHz beam frequency and with this material, λ=34.4 mm, λ/4=8.6 mm. Z0 is the characteristic impedance of the transmission lines used in the design of the coupler. Referring to the microstrip cross-section 402 in FIG. 6b, usually Z0=50 Ohms. For Er=3.48 and the thickness of the substrate H of 0.508 mm the line width W to achieve Z0=50 Ohm is W=1 mm. An approximate size estimation of the hybrid coupler for this frequency in total is 11 mm×11 mm. Although illustrated embodiments have used hybrid couplers, in other examples, lumped elements or other couplers such as a Lange coupler may be used. In other examples any coupler which can provide two outputs with a phase difference of 90 degrees and having an isolated port may be used.

Figure 7A:
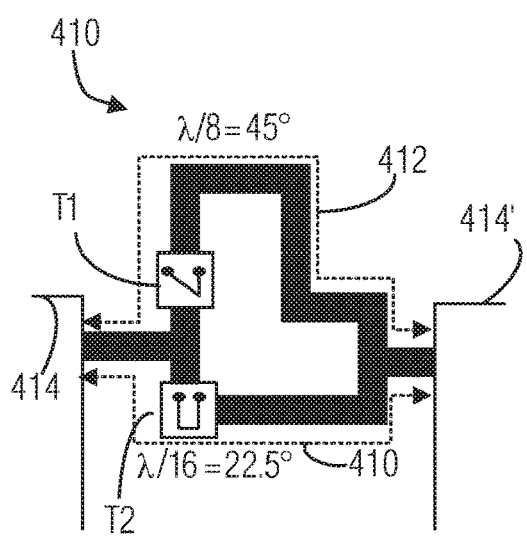
FIG. 7 shows an example implementation using microstrip transmission lines of a) switchable matrix phase shift and b) bypassable phase shifts used in embodiments of the beam former.

FIG. 7a shows an example switchable matrix phase shifter 410 using microstrip transmission lines which may be used to switch between a 45 degree and 22.5 degree phase shift. The delay path 412 between couplers 414, 414' has a delay of λ/8 corresponding to a phase shift of 45 degrees and is controlled by switch T1. The delay path 412 as shown is implemented with a meander topology which may reduce the area. The delay path 410 between couplers 414, 414' has a delay of λ/16 corresponding to a phase shift of 22.5 degrees and is controlled by switch T2. Switches T1 and T2 may be implemented as MOS transistors (or other transistors), or using a PiN diode. It will be appreciated that further example switchable matrix phase shifters may be implemented with different delay paths.

Figure 7B:
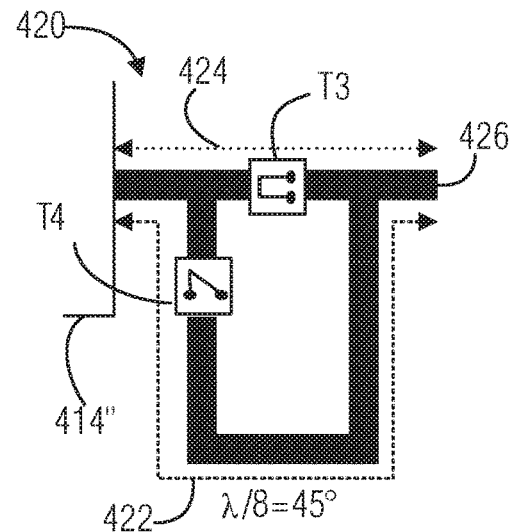

FIG. 7b shows an example bypassable phase shifter 420 using microstrip transmission lines which may select either a 45 degree phase shift or 0 degree phase shift. The bypass path 424 between coupler 414" and antenna terminal 426 is controlled by switch T3. The delay path 422 between coupler 414" and antenna terminal 426 has a delay of λ/8 corresponding to a phase shift of 45 degrees and is controlled by switch T4. It will be appreciated that in examples values within 5% of these delays may be used.

For a 22.5° phase shift at 5.8 GHz, the phase delay is $2*\pi*L/\lambda$. For a microstrip line with Z0=50 Ohms, with W=1 mm and L=λ/16, this corresponds to a path length of 2.15 mm. The 45° phase shift requires a line length of L=λ/8=4.3 mm. The transmission lines may be implemented with a meander shape which may reduce the area of the beam former.

Figure 8A:
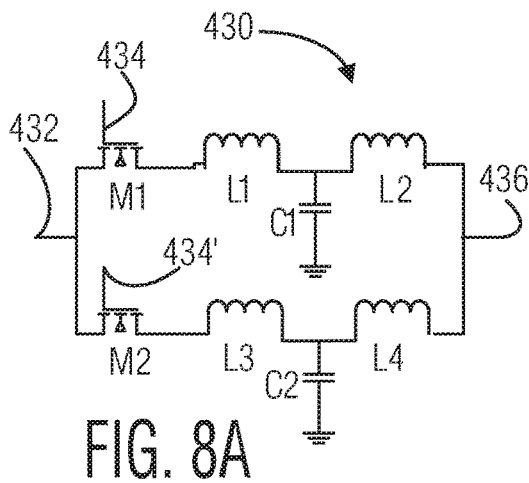
FIG. 8 shows an example implementation using lumped components of a) switchable matrix phase shift and b) bypassable phase shifts used in embodiments of the beam former.

FIG. 8a shows an example switchable matrix phase shifter 430 using inductors and capacitors. A first series arrangement of a MOS transistor M1, inductance L1 and L2, is connected between a first terminal 432 and second terminal 436. A capacitor C1 is connected between the common connection between inductors L1 and L2 and a ground connection. A second series arrangement of a MOS transistor M2, inductance L3 and L4 is connected between a first terminal 432 and second terminal 436. A capacitor C2 is connected between the common connection between inductors L3 and L4 and a ground connection. The MOS transistor M1 may be controlled via control line 434 connected to the gate terminal. The MOS transistors M2 may be controlled via control line 434' connected to the gate terminal. Transistor M1 may be switched on and transistor M2 switched off, so that a phase delay between first terminal 432 and second terminal 436 is due components L1, L2, C1. Alternatively transistor M1 may be switched off and transistor M2 switched on, so that a phase delay between first terminal 432 and second terminal 436 is due components L3, L4, C2. In other examples additional switch transistors may be added to isolate the components L1, L2, C1 or L3, L4, C2 from the second terminal 436 when the respective phase delay is not required.

At a beam frequency of 5.8 GHz, for a 22.5 degree phase shift L1=L2 and is equal to 0.285 nH, C1 is equal to a value of 0.2 pF. At a beam frequency of 5.8 GHz, for a 45 degree phase shift L3=L4 and is equal to 0.9 nH, C2 is equal to a value of 0.2 pF. As will be appreciated, in other examples, different phase shifts may be implemented by altering the values of the inductors and capacitors.

Figure 8B:
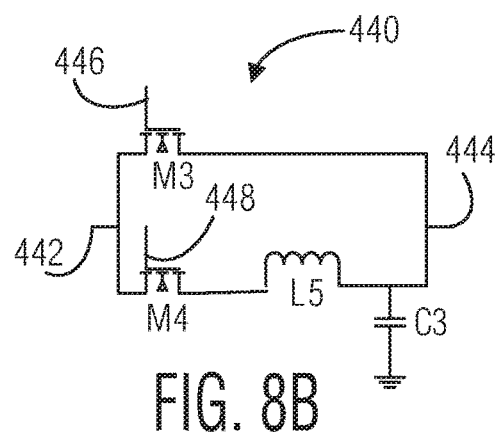

FIG. 8b shows an example of a bypassable phase shifter 440 implemented using an LC circuit. A MOS transistor 446 is connected between a first terminal 442 and a second terminal 444. A series arrangement of a MOS transistor M4 and inductance L5 is connected between a first terminal 442 and second terminal 444. A capacitor C3 is connected between the inductor L5 and a ground connection. The MOS transistor M3 may be controlled via control line 446 connected to the MOS transistor gate terminal. The MOS transistor M4 may be controlled via control line 448 connected to the gate terminal. In operation transistor M3 may be switched on and transistor M4 switched off, so that the LC components are bypassed, which may correspond to a zero phase delay. Alternatively transistor M3 may be switched off and transistors M4 switched on, so that a phase delay between first terminal 442 and second terminal 444 is due components L5 and C3. In other examples, additional switch transistors may be added to completely isolate the components L5 and C3 from the second terminal 444 when the phase delay is not required.

For example at a signal frequency of 5.8 GHz, for a 22.5 degree phase shift L5 equals to 0.54 nH, C3 is equal to a value of 0.2 pF. At a signal frequency of 5.8 GHz, for a 45 degree phase shift L5 is equal to 1.65 nH, C3 is equal to a value of 0.2 pF.

Figure 9:
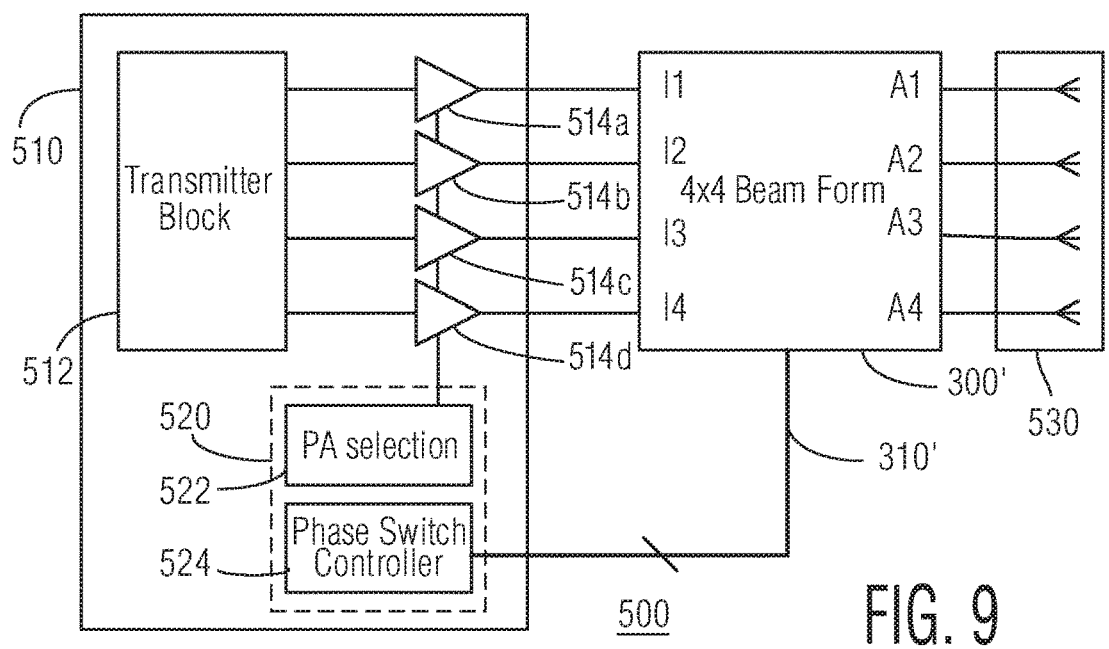
FIG. 9 shows an RF transmitter including a4 antenna array including a beam former according to an embodiment.

FIG. 9 shows a transmitter system 500 for transmitting a beam via an antenna array in 8 selectable beam angles. The beam transmitted may be a radio frequency (RF) signal or other frequency. The transmitter system 500 includes a transmitter 510 which may be implemented as an integrated circuit. The transmitter system 500 includes a beam former 300' and an antenna array 530 which may be a patch antenna array having 4 antennas. The transmitter 510 includes a transmitter block 512 connected to four power amplifiers 514a-d and a controller 520. The power amplifiers 514a-d may be controlled from a controller 520 including a power amplifier selector 520 which is connected to a control input of each of the power amplifiers 514a-d. The controller 520 may also include a phase switch controller 524 which may be connected to the control inputs of the switchable phase shifters and bypassable phase shifters of beam former 300' via control bus 310'. The outputs of each of the power amplifiers 514a-d may be connected to a respective one of the transceiver terminals i1 to i4 of the beam former 300'. The antenna terminals a1-a4 may be connected to a respective antenna in the antenna array 530. The transmitter block 512 and the controller 520 may for example be implemented in hardware, or a combination of hardware and software executable on a microprocessor. The power amplifiers 514a-d may be implemented in hardware.

In operation, the transmitter block 512 may generate a signal to be transmitted via one of the four power amplifiers 514a-d. The controller 520 may select one of the transceiver terminals i1 to i4 by enabling a respective one of the power amplifiers 514a-d with power amplifier selector 520. The phase switch controller 524 may control the beam former 300' to operate in one of two modes. In a first mode the beam former is configured with phase shifts which are equivalent to a conventional 4×4 butler matrix. In a further mode the beam former may be configured with alternative phase shifts for each path between a respective transceiver terminal i1 to i4 and antenna terminal a1 to a4. The control of each of the switchable matrix phase shifters and the bypassable phase shifters, in the further mode may be different dependent on which of the transceiver terminals i1 to i4 are selected for transmission. This is because the phase shift values in the further mode in a particular path may be different dependent on which transceiver terminal i1 to i4 is used. The transmitter system 500 allows a transmitted beam to be formed or steered at one of 8 selectable different beam angles which may have a reduced area compared to a conventional transmitter system including a beam former.

The transmitter system 500 including the beam former 300' may be used for example for radar at frequencies of 77 to 84 GHz, for communication with drones which may use frequencies above 60 GHz, for Car Wi-Fi system, also referred to as Car 2× or IEEE 802.11p. In other examples the embodiments of the beam former may be used in license plate readers or tag readers at UHF (400 MHz to 900 MHz) or WiFi (2.4 GHz to 6 GHz) frequencies. In other examples, embodiments of the beam former may be included in 5G radio communication system in frequency ranges between 5 GHz and 90 GHz.

Figure 10:
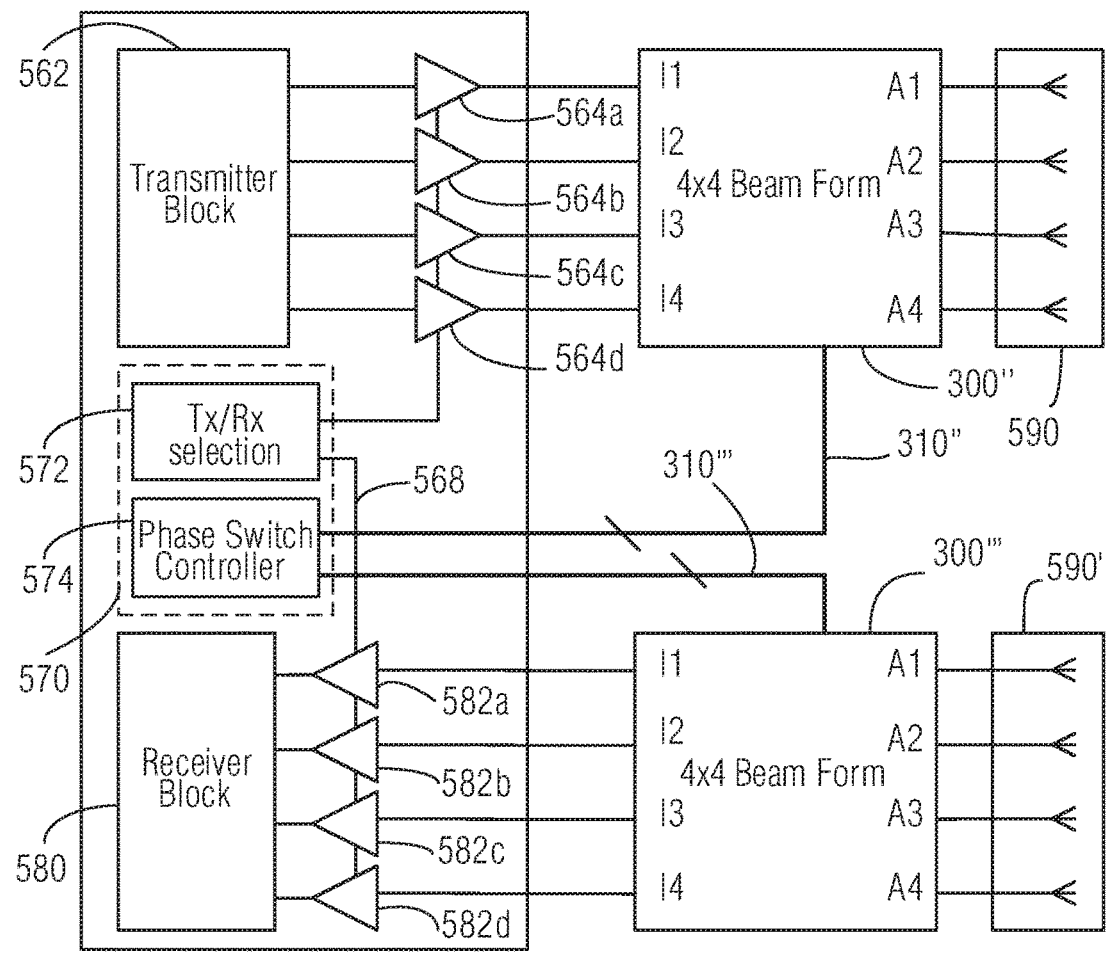
FIG. 10 shows an RF transceiver system according to an embodiment.

FIG. 10 shows a transceiver system 550 for transmitting and/or receiving a beam via an antenna array in 8 selectable beam angles. The beam may be a radio frequency (RF) signal or other frequency. The transceiver system 550 includes a transceiver 560 which may be implemented as an integrated circuit. The transceiver system 550 includes a transmit beam former 300' and a transmit antenna array 590 having 4 antennas. The transceiver system 550 includes a receive beam former 300'' and a receive antenna array 590' having 4 antennas.

The transceiver 560 includes a transmitter block 562 connected to four power amplifiers 564a-d and a controller 570. The power amplifiers 564a-d may be controlled from a transmit/receive selector 572 in the controller 570 which is connected to a control input of each of the power amplifiers 564a-d. The controller 570 may also include a phase switch controller 574 which may be connected to the control inputs of the switchable phase shifters and bypassable phase shifters of transmit beam former 300'' via control bus 310''. The outputs of each of the power amplifiers 564a-d may be connected to a respective one of the transceiver terminals i1 to i4 of the transmit beam former 300''. The antenna terminals a1-a4 may be connected to a respective antenna in the transmit antenna array 590.

The transceiver 560 includes a receiver block 580 connected to four receiver amplifiers 582a-d and the controller 570. The receiver amplifiers 582a-d may be controlled from a transmit/receive selector 572 in the controller 570 which is connected 568 to a control input of each of the receiver amplifiers 582a-d. The controller 570 may also include a phase switch controller 574 which may be connected to the control inputs of the switchable phase shifters and bypassable phase shifters of receive beam former 300''' via control bus 310'''. The inputs of each of the receiver amplifiers 582a-d may be connected to a respective one of the transceiver terminals i1 to i4 of the second beam former 300'. The antenna terminals a1-a4 of the receive beam former 300''' may be connected to a respective antenna in the receive antenna array 590'.

The transmitter block 562, the receiver block 580 and the controller 570 may for example be implemented in hardware, or a combination of hardware and software executable on a microprocessor.

In operation, the transmitter block 512 may generate a signal to be transmitted via one of the four power amplifiers 564a-d. The controller 570 may select one of the transceiver terminals i1 to i4 of the transmit beam former 300'' by enabling a respective one of the power amplifiers 564a-d with the transmit-receive selector 572.

The controller 570 may select one of the transceiver terminals i1 to i4 of the receive beam former 300''' by enabling a respective one of the receive amplifiers 582a-d with the transmit-receive selector 572.

The phase switch controller 574 may control the transmit beam former 300'' to operate in a number of modes. In a first mode the beam former is configured with phase shifts which are equivalent to a conventional 4×4 butler matrix. In a further mode, the transmit beam former 300'' may be configured with alternative phase shifts for each path between a respective transceiver terminal i1 to i4 and antenna terminal a1 to a4. The control of each of the switchable matrix phase shifters and the bypassable phase shifters in the further mode may be different dependent on which of the transceiver terminals i1 to i4 are selected for transmission. This is because the phase shift values in the further mode in a particular path may be different dependent on which transceiver terminal i1 to i4 is used.

The phase switch controller 574 may control the receive beam former 300''' to operate in a number of modes. In a first mode the receive beam former 300''' may be configured with phase shifts which are equivalent to a conventional 4×4 butler matrix. In a further mode, the receive beam former 300''' may be configured with alternative phase shifts for each path between a respective transceiver terminal i1 to i4 and antenna terminal a1 to a4. The control of each of the switchable matrix phase shifters and the bypassable phase shifters in the further mode may be different dependent on which of the transceiver terminals i1 to i4 are selected to receive the beam. This is because the phase shift values in the further mode in a particular path may be different dependent on which transceiver terminal i1 to i4 is used.

The transceiver system 550 allows a received beam to be formed or steered at one of 8 selectable different beam angles which may have a reduced area compared to a conventional transceiver system including a beam former.

Embodiments of a multi-beam-former for an antenna array are described, the multi-beam former comprises N transceiver terminals for connecting a transmitter and/or receiver and N antenna terminals for connecting to a respective antenna and a plurality of couplers and matrix phase shifters arranged in an N×N Butler matrix configuration between the N transceiver terminals and the N antenna terminals. At least some of the matrix phase shifters include a switchable matrix phase shifter configured to switch between a respective first phase shift value and a respective second phase shift value; a plurality of bypassable phase shifters arranged between at least some of the couplers and the antenna terminals and configured to switch between a respective further phase shift value and a zero phase shift. The multi-beam former is operable to select one of M different beam angles for a signal beam having a wavelength $\lambda$, wherein M is greater than N.

Embodiments of the multi-beam former may be used for example for radar systems at frequencies of 77 to 84 GHz. Other embodiments of the multi beam former may be included in drone communication systems, which may use frequencies above 60 GHz. Embodiments of the multi beam former may be included in Car Wi-Fi systems, also referred to as Car 2× or IEEE 802.11p. In other examples embodiments of the multi-beam former may be used in license plate readers or tag readers at UHF (400 MHz to 900 MHz) or WiFi (2.4 GHz to 6 GHz) frequencies. In other examples, embodiments of the multi-beam former may be included in 5G radio communication system in frequency ranges between 5 GHz and 90 GHz. The beam former may be used in any microwave and millimetre wave radio communication systems.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A multi-beam-former for an antenna array, the multi-beam former comprising:
   N transceiver terminals for connecting a transmitter and/or receiver and N antenna terminals for connecting to a respective antenna;
   a plurality of couplers and matrix phase shifters arranged in a N×N Butler matrix configuration between the N transceiver terminals and the N antenna terminals, at least some of the matrix phase shifters comprising a switchable matrix phase shifter configured to switch between a respective first phase shift value and a respective second phase shift value;
   a plurality of bypassable phase shifters arranged between at least some of the couplers and the antenna terminals and configured to switch between a respective further phase shift value and a phase shift bypass;
   wherein the multi-beam former is operable to select one of M different beam angles for a signal and wherein M is greater than N;
   wherein for each of the switchable matrix phase shifters, the respective first phase shift value is half the respective second phase shift value, and for each of the bypassable phase shifters, the respective further phase shift value is equal to a phase shift value of at least one of the matrix phase shifters.

2. The multi-beam former of claim 1, wherein M is less than or equal to 2N.

3. The multi-beam former of claim 2, wherein the switchable matrix phase shifter comprises a first switchable delay path in parallel with a second switchable delay path and wherein the first switchable delay path is half the value of the second switchable delay path.

4. The multi-beam former of claim 3, wherein the first and second switchable delay path comprises a transmission line.

5. The multi-beam former of claim 3, wherein the first switchable delay path has a delay value within 5% of one of λ/8, λ/16 3λ/16 and the second switchable delay path has a delay value within 5% of one of λ/16, λ/32 and 3λ/32 wherein X is the wavelength of the signal through the respective switchable delay path.

6. The multi-beam former of claim 2, wherein the switchable phase shifter comprises a series arrangement of a switch and a delay element in parallel with a series arrangement of a delay element and a switch.

7. The multi-beam former of claim 1, wherein the respective first phase shift value for each of the switchable matrix phase shifters is within 5% of one of 22.5 degrees, 45 degrees and 67.5 degrees and the respective second phase shift value is within 5% of one of 11.25 degrees, 22.5 degrees and 33.75 degrees.

8. The multi-beam former of claim 1, wherein the respective further phase shift value for each of the bypassable phase shifters is within 5% of at least one of 11.25, 22.5, 33.75, 45 and 67.5 degrees.

9. The multi-beam former of claim 1 wherein each bypassable phase shifter comprises a first switchable bypass path in parallel with at least one switchable delay path.

10. The multi-beam former of claim 9, wherein the switchable bypass path and the at least one switchable delay path comprises a transmission line.

11. The multi-beam former of claim 10, wherein the at least one switchable delay path comprises a delay of within 5% of at least one of λ/8, 3λ/16, λ/16, λ/32 and 3λ/32 wherein X is the wavelength of the signal through the at least one switchable delay path.

12. A receiver system comprising the multi-beam former of claim 1 and further comprising:
   a receiver coupled to each of the transceiver terminals,
   a plurality of antennas coupled to a respective one of the antenna terminals; and wherein
   the receiver comprises a controller coupled to each of the switchable matrix phase shifters and the bypassable phase shifters, wherein the controller is operable in a first mode to select a first set of phase shift values and in a second mode to select a second set of phase shift values, and the receiver system is operable in the first mode to selectively receive a signal at one of N different beam angles and in the second mode to selectively receive a signal at one of a further N different beam angles.

13. A transmitter system comprising the multi-beam former of claim 1 and further comprising:
   a transmitter coupled to each of the transceiver terminals,
   a plurality of antennas coupled to a respective one of the antenna terminals; and wherein
   the transmitter comprises a controller coupled to each of the switchable matrix phase shifters and the bypassable phase shifters, wherein the controller is operable in a first mode to select a first set of phase shift values and in a second mode to select a second set of phase shift values, and the transmitter system is operable in the first mode to selectively transmit a signal at one of N different beam angles and in the second mode to selectively transmit a signal at one of a further N different beam angles.

14. A transceiver system comprising the multi-beam former of claim 1 and further comprising:
   a transceiver coupled to each of the transceiver terminals,
   a plurality of antennas coupled to a respective one of the antenna terminals; and wherein
   the transceiver comprises a controller coupled to each of the switchable matrix phase shifters and the bypassable phase shifters, wherein the controller is operable in a first mode to select a first set of phase shift values and in a second mode to select a second set of phase shift values, and the RF transceiver system is operable in the first mode to transmit and/or receive a signal at one of N different beam angles and in the second mode to transmit and/or receive a signal at one of a further N different beam angles.

* * * * *